United States Patent [19]

Costarelli

[11] Patent Number: 4,483,226
[45] Date of Patent: Nov. 20, 1984

[54] MACHINE FOR SHEARING FILMS OF THERMOPLASTIC MATERIAL

[76] Inventor: Edoardo Costarelli, Via F. 11i Pellas, 34, Perugia, Italy, 06100

[21] Appl. No.: 421,159

[22] Filed: Sep. 22, 1982

[30] Foreign Application Priority Data

Aug. 18, 1982 [IT] Italy .............................. 49002 A/82

[51] Int. Cl.³ .............................................. B26D 7/06
[52] U.S. Cl. .................................... 83/425.3; 83/437; 83/620; 83/923
[58] Field of Search ...................... 83/437, 425, 425.2, 83/425.3, 444, 923, 690, 639, 425.1, 431, 404.3, 212.1, 620

[56] References Cited

U.S. PATENT DOCUMENTS

| | | | |
|---|---|---|---|
| 1,496,917 | 6/1924 | Baerenfaenger | 83/425.3 |
| 1,623,089 | 4/1927 | Burpee | 83/427 |
| 2,242,932 | 5/1941 | Turner | 83/425.3 |
| 2,283,030 | 5/1942 | Bakewell | 83/425.3 |
| 4,062,260 | 12/1977 | Steinhogl | 83/437 |
| 4,342,242 | 8/1982 | Schaum | 83/437 |

Primary Examiner—James M. Meister
Assistant Examiner—J. L. Knoble
Attorney, Agent, or Firm—Holman & Stern

[57] ABSTRACT

Machine for shearing films of thermoplastic material between a compression surface (5), joined to a piston (4) and operated hydraulically by means of a cylinder (3) from an electric motor powered pump, and the latticed bottom of a container (1). The latticed bottom has open mesh (8') along the perimeter, in which punches (6) on the compression surface (5) penetrate. The hydraulic device, the density of the cutting profiles and the cooperation of the punches (6) to expel the material through the mesh (8') reduce energy consumption to 1/10 with respect to rotation type shearing machines.

11 Claims, 5 Drawing Figures

MACHINE FOR SHEARING FILMS OF THERMOPLASTIC MATERIAL

BACKGROUND OF THE INVENTION

1. Field of the Invention

This invention relates to a machine for shearing films of thermoplastic material, such as PVC, polyethylene, polypropylene, etc.

2. Description of the Prior Art

It is known that thermoplastic materials like PVC, polyethylene, polypropylene, etc. for various uses, such as shopping bags, packing sacks, greenhouse awnings, etc., are recovered after use to be recycled to prepare new products. To this end the recovered waste is run through a series of regeneration operations, the first of which is shearing.

Shearing of the recovered waste is currently effected in so-called mills, that is in cylinders generally cylindrical in shape arranged with the cylinder axis vertical to the ground, with internal blades which shear the material while rotating about a shaft coincident with the geometric axis of the cylindrical container. This shearing system has numerous disadvantages. First of all, the blades are subjected to considerable wear and tear during use, and it is time-consuming to replace them and sharpen them and their expensive attachments. If the material to be sheared in the mill is damp, it "packs", that is it sticks to the walls of the drum of the container during operation. Moreover, the presence of foreign bodies in the recovered material inside the mill cannot be opportunely detected, that is, rotation of the blades cannot be stopped before they are damaged. Finally, and most seriously, electrical energy consumption is considerable, also in relation to the power used and the recurrence of its costs in billing.

Currently, if the above described mills are not used, the recovered material must be washed in its original bulky dimensions, that is in pieces of considerable size. However, this leads to high electricity costs in all the operations subsequent to shearing.

BRIEF SUMMARY OF THE INVENTION

The object of this invention is to provide a machine for shearing thermoplastic waste materials above all with extremely reduced energy consumption in comparison with current mills resulting in great savings in the power used. This machine thus has blades which are not subjected to wear and tear, and therefore have minimum replacement and sharpening costs. Furthermore, even when wet, the material does not stick to the walls of the machine. Any foreign bodies present will not damage the cutting system as a whole, but rather will affect only a very small, almost negligible area.

The invention achieves this goal with an electric motor powered machine where:
shearing is effected by compression, with the aid of a hydraulic device;
said compression to shear the material occurs inside a container between compression devices joined to a hydraulic system and mesh shearing devices making up the bottom of the container.

The fundamental concept of the invention thus lies in shearing by compression to be effected so as to minimize as much as possible the use of electricity.

According to the invention, one of these devices is the association of a hydraulic group with the electric motor, where said group provides most of the energy required to exert the pressure necessary for shearing. In fact, the motor operates a pump which pressurizes the fluid to advance a piston containing a first compression surface, comprising said pressure devices.

The second compression surface is represented by the bottom of the container and comprises said shearing devices. According to the invention, this bottom consists of blades with the cutting edge toward the inside of the container, arranged in a lattice with polyhedral mesh, preferably square or rectangular.

The fact that shearing of the material is distributed over a large cutting mesh contributes to reducing the energy required for shearing. In fact, in this way the density of the cutting profiles is increased. Cutting into smaller pieces facilitates the subsequent treatment of the material.

According to the invention, one essential feature is that every other mesh of the outer perimetrical row of the lattice is open along the inner side edges of the container. Punches attached to said compression surface penetrate the entire depth of these mesh, along its outer perimeter, and are arranged in spaced relation to interengage in the alternate open mesh of the second compression surface (lattice).

Expulsion of the material from the open mesh on the lattice perimeter, either down or to the side, due to the cooperation of said punches of the first compression surface with said open mesh of the second compression surface, is indispensable according to the invention, since it effects the shearing operation. Repeated experiments have shown that, in the absence of these devices, the pressure required for shearing would be so high as to make the proposed system almost impossible.

The advantages of the machine for shearing films of thermoplastic material according to the invention are evident on the basis of the above discussion. Obviously, the static operation of the blades, their lattice arrangement, and the density of the cutting profiles protect them from wear and tear and damage, and considerably reduce their replacement requirements. The presence of any foreign bodies cannot affect the entire cutting profile, but rather only a limited impact zone. The material cannot stick to the walls even when wet, since the machine moves in compression rather than rotation. Above all, based on various experiments, the devices described lead to electricity consumption and power costs which are 1/10 of those found with traditional rotating blade mills.

BRIEF DESCRIPTION OF THE DRAWINGS

The invention is described below in more detail, with reference to a preferred embodiment shown in the accompanying drawings wherein:

FIG. 1 is a partially cut away prospective view of the entire container where shearing takes place according to the invention;

DETAILED DESCRIPTION

Figures 2, 3, 4, 5:
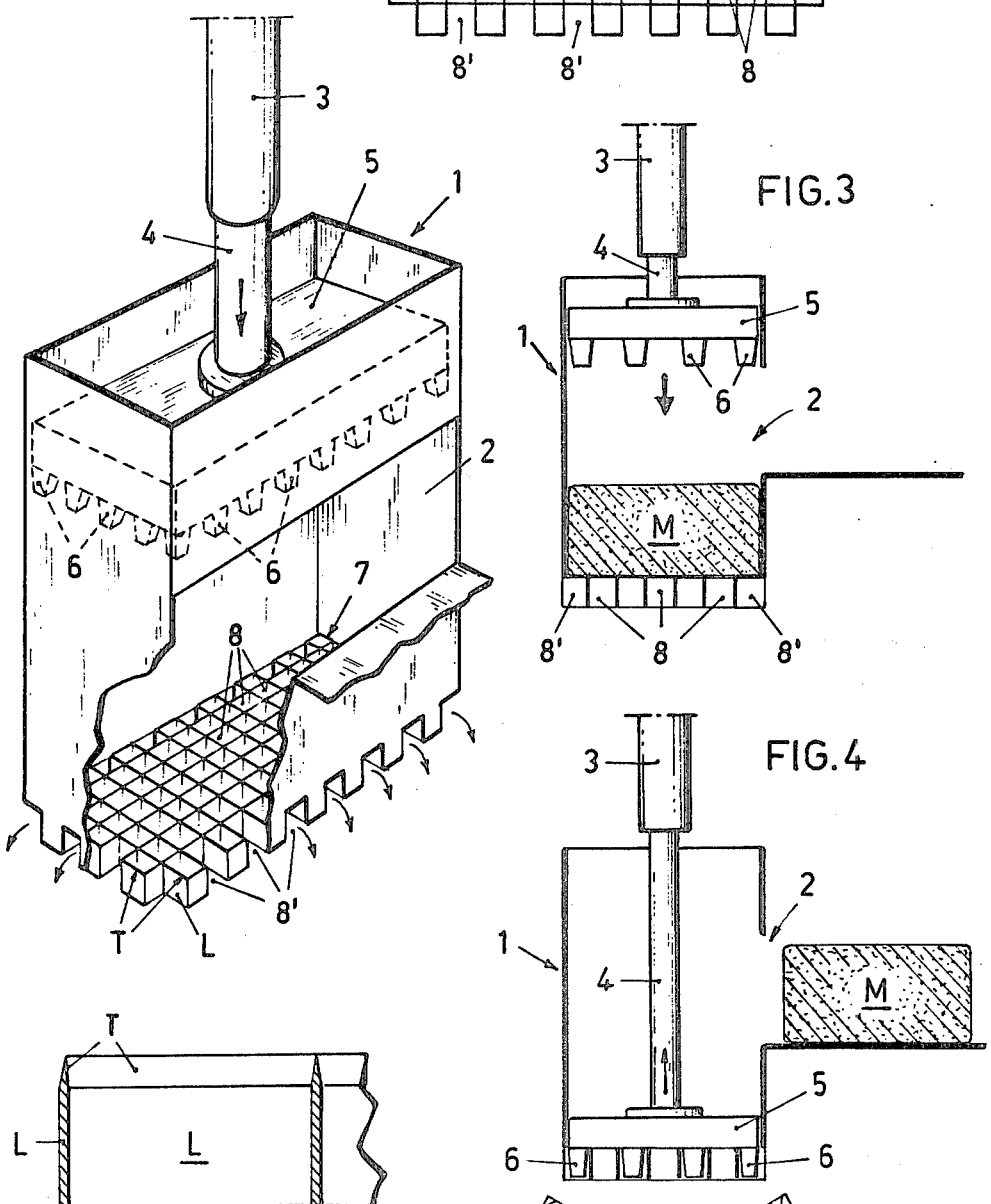
FIG. 2 is a top plan view of the bottom of the container of FIG. 1, showing the lattice shape.
FIG. 3 is a cross-sectional view of the container of FIG. 1 charged with material, with the piston in the upper rest position.
FIG. 4 is a cross-sectional view with the piston fully extended and the material sheared and expelled from the bottom.
FIG. 5 is a cross-sectional view showing a detail of part of a blade.

In FIG. 1, the container where shearing takes place is indicated generally at 1, with opening 2 for material input. An electric motor powers a pump (both not shown) which pressurizes a hydraulic device consisting of a cylinder 3 with piston 4, which presses at the end on a first compression surface 5 equipped with punches 6 along its entire outer perimeter. Punches 6 are arranged and shaped to penetrate the mesh 8' on the bottom of container 1 when said first compression surface 5 is lowered. As shown in the drawing, the mesh 8' are open along the lower sides of container 1. The bottom of container 1 consists of a single piece of tempered steel, realized as a lattice of blades L with the edge T toward the inside of container 1 (FIG. 5). As already mentioned, the hydraulic device consisting of cylinder 3 and piston 4 contributes to reducing loss of the energy supplied by the electric motor.

FIG. 3 shows the machine just before compression by surface 5 joined to piston 4. Material M has already been inserted and rests on mesh 8,8' of the latticed bottom of container 1. Lattice mesh 8 are closed and alternate with open mesh 8'. When piston 4 is lowered, the punches 6 penetrate the mesh 8' to expel the material out the bottom and out the sides.

This phase, that is, the actual shearing operation, is shown in FIG. 4, where piston 4 with compression surface 5 is at the end of its run and additional material M has been moved near the inlet opening 2 of container 1. As already mentioned, the cooperation of punches 6 and the open mesh 8' is indispensable to the shearing by compression and is a determining factor in substantially reducing the pressure required.

The object of the invention has been described and illustrated with reference to one preferred embodiment. Of course, variations in arrangement, proportions, and size are possible without going beyond the bounds of the invention.

For example, the machine may be operated in a horizontal rather than vertical position. Also, the latticed bottom may be made from single modules welded together rather than from a single piece. It would also be possible to operate with two hydraulic devices with blades at 90°. In this case, shearing would occur by compression of the material between the two blade surfaces, each advanced by its own hydraulic device.

I claim:

1. Machine for shearing films of thermoplastic material comprising:
   a hollow container having a top and bottom and side walls;
   a mesh shearing device mounted at the bottom of the container formed by a lattice of blades with their cutting edges directed inwardly of the container;
   a compression plate mounted within said container for movement between the top and lattice at the bottom; and having its peripheral surface in close proximity to the interior surface of said side walls;
   a plurality of punch members on the peripheral area only of the side of said compression plate facing said lattice, said punch members protruding from said plate toward said lattice and being spaced with respect to each other so that they are interengageable with peripheral mesh openings in said lattice so that in operation said punches and compression plate between said lattice and compression plate push material through said lattice to shear the material;
   a hydraulic device operatively connected to said compression plate to move it reciprocally in said container; and
   electric motor means to provide hydraulic fluid pressure to operate said hydraulic device.

2. A shearing machine as claimed in claim 1 and further comprising:
   said peripheral mesh of said lattice into which said punches are engageable are open at the peripheral outer sides of the container so that the material pushed therethrough can be expelled to the sides of said bottom as well as downwardly through said bottom.

3. A shearing machine as claimed in claim 1 wherein:
   said punches are in the shape of truncated pyramids having the smaller base remote from the compression plate.

4. A shearing machine as claimed in claim 2 wherein:
   said punches are in the shape of truncated pyramids having the smaller base remote from the compression plate.

5. A shearing machine as claimed in claim 3 wherein:
   said punches are of predetermined length with respect to the thickness of the lattice so that the material engaged by said punches is substantially expelled through said respective peripheral mesh openings before the remaining material is pushed through the remaining mesh openings of the lattice.

6. A shearing machine as claimed in claim 4 wherein:
   said punches are of predetermined length with respect to the thickness of the lattice so that the material engaged by said punches is substantially expelled through said respective peripheral mesh openings before the remaining material is pushed through the remaining mesh openings of the lattice.

7. A shearing machine as claimed in claim 5 wherein:
   said punches are peripherally spaced with respect to each other a distance substantially equal to two mesh openings so that said punches interengage alternate peripheral mesh openings.

8. A shearing machine as claimed in claim 6, wherein:
   said punches are peripherally spaced with respect to each other a distance substantially equal to two mesh openings so that said punches interengage alternate peripheral mesh openings.

9. A shearing machine as claimed in claim 1, wherein:
   said cutting edges form cutting profiles having a relatively high density with respect to the total area of the bottom of the container so that the shearing produces small pieces of material.

10. A shearing machine as claimed in claim 8, wherein:
    said cutting edges form cutting profiles having a relatively high density with respect to the total area of the bottom of the container so that the shearing produces small pieces of material.

11. Machine for shearing films of thermoplastic material powered by an electric motor comprising:
    a hollow container having a top and bottom and side walls;
    a mesh shearing device at the bottom of the container formed by a lattice of blades so that material forced through said lattice from inside the container will be sheared by said blades;
    a compression device comprising a plate shaped compressor operatively mounted within said container between the top and latticed bottom thereof for movement toward and away from said latticed bottom with the outer peripheral surface thereof in close relationship with said side walls, punches along the entire outer perimeter of said compressor and spaced apart a distance equal to two mesh so that said punches are interengageable in alternate mesh on the perimeter of said latticed bottom;

a hydraulic cylinder and piston device having the piston thereof operatively connected to said compressor; and electric motor means to supply hydraulic fluid to said cylinder to operate said piston, so that said piston moves said compressor toward said latticed bottom to compress and force material between said compressor and said latticed bottom through said bottom.

* * * * *